(12) United States Patent
Dong et al.

(10) Patent No.: US 11,349,167 B1
(45) Date of Patent: May 31, 2022

(54) OPEN METAL-AIR FUEL CELL SYSTEM CAPABLE OF UNINTERRUPTIBLE POWER SUPPLY (71) Applicant: TRANSLATIONAL RESEARCH CENTER, SCHOOL OF MECHANICAL AND VEHICLE, BEIJING INSTITUTE OF TECHNOLOGY, TANGSHAN PORT ECONOMIC DEVELOPMENT ZONE, Tangshan (CN)

(72) Inventors: Mingming Dong, Tangshan (CN); Liang Liang, Tangshan (CN); Yu Zhang, Tangshan (CN)

(73) Assignee: TRANSLATIONAL RESEARCH CENTER, SCHOOL OF MECHANICAL AND VEHICLE, BEIJING INSTITUTE OF TECHNOLOGY, TANGSHAN PORT ECONOMIC DEVELOPMENT ZONE (*) Notice: Subject to any disclaimer, the term of this patent is extended or adjusted under 35 U.S.C. 154(b) by 0 days.

(21) Appl. No.: 17/621,742

(22) PCT Filed: Mar. 19, 2021

(86) PCT No.: PCT/CN2021/081746
§ 371 (c)(1),
(2) Date: Dec. 22, 2021

(87) PCT Pub. No.: WO2021/190408
PCT Pub. Date: Sep. 30, 2021

(30) Foreign Application Priority Data

Mar. 27, 2020 (CN) .......................... 202010227262.7

(51) Int. Cl.
H01M 12/08 (2006.01)
H01M 8/04276 (2016.01)
(Continued)

(52) U.S. Cl.
CPC ......... *H01M 12/08* (2013.01); *H01M 8/0438* (2013.01); *H01M 8/04283* (2013.01); *H01M 8/04477* (2013.01)

(58) Field of Classification Search
None
See application file for complete search history.

(56) References Cited

U.S. PATENT DOCUMENTS 11,133,565 B2 9/2021 Takahashi et al.
2004/0137291 A1* 7/2004 Smedley ............... H01M 12/06
429/432

(Continued)

FOREIGN PATENT DOCUMENTS

CN 101794890 A 8/2010
CN 110313101 A 10/2019

(Continued)

OTHER PUBLICATIONS

Written Opinion of the International Searching Authority issued in connection with International Application No. PCT/CN2021/081746, dated Apr. 27, 2021 with English translation (8 pages total).

(Continued)

*Primary Examiner* — Brian R Ohara
*Assistant Examiner* — Patrick Marshall Greene
(74) *Attorney, Agent, or Firm* — John Maldjian; Stevens & Lee PC (57) ABSTRACT Embodiments of the invention relate to an open metal-air fuel cell system capable of uninterrupted supply power, which relates to the field of metal-air fuel cell stacks and comprises a sensing subsystem, a controller, a circulating (Continued)

filtration subsystem, an electrolyte solution tank and several open metal-air fuel cell units. Open metal-air fuel cell units are sequentially arranged within the electrolyte solution tank, and each open metal-air fuel cell unit is connected with each other in parallel. An air electrode of the open metal-air fuel cell unit has a tank structure, and the trough structure has a concave surface upwards. The sensing subsystem is arranged within the electrolyte tank. The electrolyte solution tank is connected with a circulating filtration subsystem. The controller is used for controlling a circulating flow of the circulating filtration subsystem depending on electrolyte solution temperature information collected by the sensing subsystem.

10 Claims, 4 Drawing Sheets

(51) Int. Cl.
*H01M 8/0438* (2016.01)
*H01M 8/0444* (2016.01)

(56) References Cited

U.S. PATENT DOCUMENTS

2020/0006745 A1* 1/2020 Westwood ............ H01M 50/46
2021/0320369 A1* 10/2021 Takahashi ........... H01M 50/256

FOREIGN PATENT DOCUMENTS

| CN | 111403778 A | 7/2020 |
| JP | 2010257839 A | 11/2010 |

OTHER PUBLICATIONS

International Search Report dated Apr. 27, 2021 issued in connection with International Application No. PCT/CN2021/081746 with English translation (4 pages total).

* cited by examiner

OPEN METAL-AIR FUEL CELL SYSTEM CAPABLE OF UNINTERRUPTIBLE POWER SUPPLY

CROSS REFERENCE TO RELATED APPLICATION

This application is a § 371 of International Application No. PCT/CN2021/081746, filed Mar. 19, 2021, entitled, "OPEN METAL-AIR FUEL CELL SYSTEM CAPABLE OF UNINTERRUPTIBLE POWER SUPPLY" which claims priority to Chinese Patent Application No. 202010227262.7, filed Mar. 17, 2020, entitled "OPEN METAL-AIR FUEL CELL SYSTEM CAPABLE OF UNINTERRUPTIBLE POWER SUPPLY"; both of which are incorporated herein by reference in their entirety.

BACKGROUND

The invention relates to the field of metal-air fuel cell systems, and in particular to an open metal-air fuel cell system capable of uninterruptible power supply.

As a widely used power battery, the lithium ion battery pack is characterized by high power density and long cycle life, which is widely used for power equipment. However, the lithium-ion battery also has inherent defects. One defect is low energy density. In the field of electric vehicles where the lithium-ion battery is widely used as an energy source, the lithium-ion battery has caused unsatisfactory endurance mileage to battery electric vehicles (BEVs) due to low energy density. Another defect is that the lithium-ion battery has a higher requirement for charging and discharging temperature. Generally, the lithium-ion battery can't be charged when the temperature is below 0 degrees Celsius, and the battery can't work when the temperature is below −10 degrees Celsius, which brings great inconvenience for winter use in cold regions. In addition, both the inherent safety problem and recycling problem of the lithium-ion battery urgently require alternative batteries to replace the lithium battery. In addition to great advantages over the lithium-ion battery in terms of power density, the air fuel cell is also significantly superior to the lithium-ion battery in terms of energy density, environmental friendliness and safety of products, which pertains to a promising development landscape.

The air fuel cell is categorized by different types of anodes into a hydrogen fuel cell and a metal-air fuel cell. The hydrogen fuel cell uses hydrogen as the anode and oxygen as the cathode to obtain water as the product. High-pressure hydrogen is very high in energy density, but it is difficult to store and transport, and also has great danger so that many countries have stopped developing hydrogen fuel cells nowadays.

With simple products, the metal-air fuel cell stack is not only high in power density and easy in recycling, but also has great environmental friendliness, high energy density of metal electrodes, and transportation and storage convenience, which is a very promising energy device. The metal-air fuel cell uses active metals as the anode and oxygen as the cathode to obtain metal salt or hydroxides as the product. Currently, the active metals commonly used include magnesium, aluminum and zinc. The metal-air fuel is categorized by different pH values of electrolyte solutions in use into an acid electrolyte-solution cell, an alkaline electrolyte-solution cell, and a neutral electrolyte-solution cell, wherein only acid or alkaline electrolyte solutions can be used for aluminum and zinc. Since magnesium has stronger metal activity, a neutral salt solution (such as NaCl solution) may be used as the electrolyte solution.

In principle, the metal-air fuel cell pertains to the disposable battery. Metal electrodes on the metal-air fuel cell will be depleted during use and must be replaced upon depletion. For the metal-air fuel cell using acidic or alkaline electrolyte solution, acid and alkali in the electrolyte solutions will be depleted during discharge, resulting in the degradation of the cell performance. When the depletion comes to a certain degree or the product reaches a certain concentration, replacement is required for the metal-air fuel cell. For the metal-air fuel cell adopting neutral electrolyte solutions, although solution properties have no change during the reaction, the metal hydroxide in the product is insoluble in water, so that the electrolyte solution is reduced in fluidity, thus degrading the cell performance. When the product reaches a certain amount, it must be cleaned out.

Metal-air fuel cell stacks in the prior art adopt independent cells, and the replacements of electrolyte solutions and metal anodes are both complicated. Although the metal-air fuel cell stacks in the prior art also adopt circulation filtration of electrolyte solutions, since each cell is independent, it is difficult to completely update the electrolyte solutions by circulation filtration which results in many corners and requires complete disassembly and maintenance over time. Besides, due to constrained flow of the electrolyte solutions, it is also not easy to cool the cells through the electrolyte solutions. To keep the cell temperature stable during high-power discharge, an additional air cooling system is necessary, thus resulting in a complex structure, the unreliable operation and the increasing difficulty of the BMS system design.

When the metal electrodes are depleted, the power supply must be shut off during the electrode replacement because each cell is independent and connected in series or in series and parallel. However, such shutoff is unacceptable to large-scale power stations adopting metal-air fuel cells as power supply units. Moreover, the replacement procedure is complicated as well, which is undesirable for the product recovery.

SUMMARY

Embodiments in accordance with the present invention provide an open metal-air fuel cell system capable of uninterruptible power supply.

An open metal-air fuel cell system capable of uninterruptible power supply, including a metal-air fuel cell, a sensing subsystem, a controller, and a circulating filtration subsystem is provided; wherein the metal-air fuel cell stack comprises an electrolyte solution tank and several open metal-air fuel cell units; the open metal-air fuel cell units are sequentially arranged within the electrolyte solution tank, and all the open metal-air fuel cell units are connected with each other in parallel; wherein an open metal-air fuel cell unit includes a metal electrode and an air electrode; the metal electrode is positioned below the air electrode; the air electrode has a trough structure, and the trough structure has a concave surface upwards; an electrolyte solution in the electrolyte solution tank is at a height submerging lower surfaces of the metal electrode and the air electrode without surpassing an upper edge of the air electrode; wherein the sensing subsystem is arranged in the electrolyte solution tank; the sensing subsystem is used for acquiring temperature information, liquid level information and concentration information of the electrolyte solution and sending the temperature information, the liquid level information and the concentration information of the electrolyte solution to the controller;

a solution outlet of the electrolyte solution tank is connected with a first solution inlet of the circulating filtration subsystem through a solution outlet pipeline; a solution inlet of the electrolyte solution tank is connected with a solution outlet of the circulating filtration subsystem through a first solution inlet pipeline; and the controller is electrically connected with the circulating filtration subsystem; and the controller is used for controlling a circulating flow of the circulating filtration subsystem according to temperature information of the electrolyte solution.

Optionally, the system also includes an electrolyte solution supplement subsystem; and a solution outlet of the electrolyte solution supplement subsystem connected with a second solution inlet of the circulating filtration subsystem through a second solution inlet pipeline.

The controller is electrically connected with the electrolyte solution supplement subsystem; and the controller is used for controlling a supplement flow of the electrolyte solution supplement subsystem according to liquid level information and concentration information of the electrolyte solution.

Optionally, the open metal-air fuel cell unit further includes a fixing clamp, a DCDC module and a bus board.

The air electrode is equipped with the bus board at one end, and equipped with the fixing clamp at the other end; the metal electrode and the air electrode are both fixed together with the bus board through copper sheets; wherein anode and cathode wires built in the bus board are electrically connected with the DCDC module; and the open metal-air fuel cell unit is fixed within the electrolyte solution tank by using the fixing clamp.

Optionally, a hollow support plate is arranged in the middle of the electrolyte solution tank, and the electrolyte solution tank is provided at either side with a solution inlet and a solution outlet with different sizes; and the hollow support plate is used for avoiding direct contact between the metal electrode and the electrolyte solution tank.

Optionally, the metal-air fuel cell stack is provided with an anode bus and a cathode bus; the anode of each open metal-air fuel cell unit is connected with the anode bus, and the cathode of each open metal-air fuel cell unit is connected with the cathode bus.

Optionally, the bus board is provided with two connecting terminals, namely a first connection terminal and a second connecting terminal; the first connection terminal uses nuts to fix the anode of the open metal-air fuel cell unit and the anode bus of the metal-air fuel cell stack; and the second connecting terminal uses nuts to fix the cathode of the open metal-air fuel cell unit and the cathode bus of the metal-air fuel cell stack.

Optionally, the circulating filtration subsystem includes a sedimentation tank, a filter screen, a circulating pump, and a heat sink; wherein the sedimentation tank has a first solution inlet and a solution outlet, wherein the filter screen is arranged in the sedimentation tank and at the solution outlet; wherein a solution outlet of the electrolyte solution tank is connected with a first solution inlet of the sedimentation tank through a solution outlet pipeline; and a solution outlet of the sedimentation tank is connected with a solution inlet of the electrolyte solution tank through the first solution inlet pipeline, and the circulating pump and the heat sink arranged on the first solution inlet pipeline.

Optionally, the electrolyte solution supplement subsystem includes a solution supplement tank, a solution supplement pump, and a check valve; wherein a solution outlet of the solution supplement tank is connected with a second solution inlet of the sedimentation tank of the circulating filtration subsystem through the second solution inlet pipeline, and the solution supplement pump and the check valve arranged on the second solution inlet pipeline.

Optionally, the controller is electrically connected with a solution supplement pump in the electrolyte solution supplement subsystem and a circulating pump of the circulating filtering subsystem respectively.

Optionally, the sensing subsystem includes a temperature sensor, a liquid level sensor and a liquid concentration sensor.

In comparison to the prior art, embodiments of the present invention have the following beneficial effects.

In the open metal-air fuel cell system capable of uninterruptible power supply provided by the present disclosure, a cell unit adopts an open structure and shares the electrolyte solution, so only one electrolyte solution renewal system is required to ensure the stability of chemical properties, product content and temperature of the electrolyte solution. By using the weak coupling group technology (namely, the direct relationship among cell units is not close), the electrode replacement and maintenance of cell units can be performed on the premise of the power supply guarantee. With a horizontal arrangement (namely connecting the cells in parallel and sharing the electrolyte solution), since in an open environment the air electrode does not have to bear the internal pressure of the solution, it is only required to be fixed without sealing, which accelerates the production of the cell stack and ensures the operation reliability.

BRIEF DESCRIPTION OF THE DRAWINGS

The above and still further features and advantages of embodiments of the present invention will become apparent upon consideration of the following detailed description of embodiments thereof, especially when taken in conjunction with the accompanying drawings, and wherein.

DETAILED DESCRIPTION OF THE EMBODIMENTS

The embodiments described herein are only part of, not all of, embodiments in the present invention. Based on the embodiments of the present invention, all other embodiments obtained by those of ordinary skills in the art without creative work belong to the scope claimed by the present invention.

The present invention aims at providing an open metal-air fuel cell system capable of uninterruptible power supply, which realizes the metal electrode replacement under uninterruptible power supply by metal-air fuel cell stacks in the prior art, and solves the problem of electrolyte solution maintenance and cooling, thus eliminating the need of sealing structure, greatly simplifying the maintenance of metal-air fuel cells, and widening the application.

The features and advantages of the present invention will be further described with reference to figures and embodiments below.

Open style: generally, each cell unit of a metal-air fuel cell stack is independent and has its own individual electrolyte solution. According to the present disclosure, each cell unit of the composed metal-air fuel cell stack shares a common electrolyte solution which is held in a common electrolytic cell. The electrolyte solution can be renewed simply by a set of electrolyte solution renewal system, especially for a magnesium-air fuel cell using a neutral electrolyte solution which produces magnesium hydroxide, a viscous colloid. For an independent cell unit, electrolyte replacement is more difficult, which is also undesirable for the product recovery. For a metal-air fuel cell stack adopting the alkaline or acidic electrolyte solution, acid and alkali in the electrolyte solution will be continuously depleted during power supply, resulting in the change of PH value of the electrolyte solution and the reduction of discharge power. With an open structure, by circulating the electrolyte solution, reaction products can be removed, the depleted acid and alkali can be supplemented, and the whole metal-air fuel cell stack can be cooled. Especially for high-power power supply stations, circulating the electrolyte solution ensures continuous high-power discharge of the metal-air fuel cell stack.

Sealing-free: the structure of a magnesium-air fuel cell stack avoids the research and development difficulty of structural sealing. Since this structure is different from the cell of vertical arrangement, and in an open environment the air electrode does not have to bear the internal pressure of the solution, it is only required to be fixed without sealing, which accelerates the production of the metal-air fuel cell stack and ensures the operation reliability.

Uninterruptible power supply: a metal anode of the metal-air fuel cell stack will be continuously depleted during power supply. When the metal electrodes are depleted, they need to be replaced with new ones. During the replacement of traditional metal-air fuel cell stacks, the power supply has to be interrupted, the procedure for replacing metal electrodes are cumbersome, and all electrodes have to be replaced for every replacement, causing the metal waste for the cell unit with low loss. According to the present disclosure, in the metal-air fuel cell stack provided herein, each cell unit is weakly coupled with each other in parallel, so that the electrode of the unit with metal depleted can be independently replaced without affecting the power supply of the entire system so as to enable continuous power supply, which is critical for a high-power power supply station based on the metal-air fuel cell stack.

Based on principles mentioned above, an open metal-air fuel cell system capable of uninterruptible power supply, including a metal-air fuel cell, a sensing subsystem, a controller, and a circulating filtration subsystem; wherein the metal-air fuel cell stack includes an electrolyte solution tank and several open metal-air fuel cell units.

The open metal-air fuel cell units are sequentially arranged within the electrolyte solution tank, and each open metal-air fuel cell unit is connected in parallel with each other.

The sensing subsystem is arranged in the electrolyte solution tank; the sensing subsystem is used for acquiring temperature information, liquid level information and concentration information of the electrolyte solution and sending the temperature information, the liquid level information, and the concentration information of the electrolyte solution to the controller.

A solution outlet of the electrolyte solution tank is connected with a first solution inlet of the circulating filtration subsystem through a solution outlet pipeline; a solution inlet of the electrolyte solution tank is connected with a solution outlet of the circulating filtration subsystem through a first solution inlet pipeline; the electrolyte solution supplement subsystem is connected with a second solution inlet of the circulating filtration subsystem through a second solution inlet pipeline.

The controller is electrically connected with the circulating filtration subsystem; and the controller is used for controlling a circulating flow of the circulating filtration subsystem according to temperature information of the electrolyte solution.

The controller is electrically connected with the electrolyte solution supplement subsystem; and the controller is used for controlling a supplement flow of the electrolyte solution supplement subsystem according to liquid level information and concentration information of the electrolyte solution.

Figure 1:
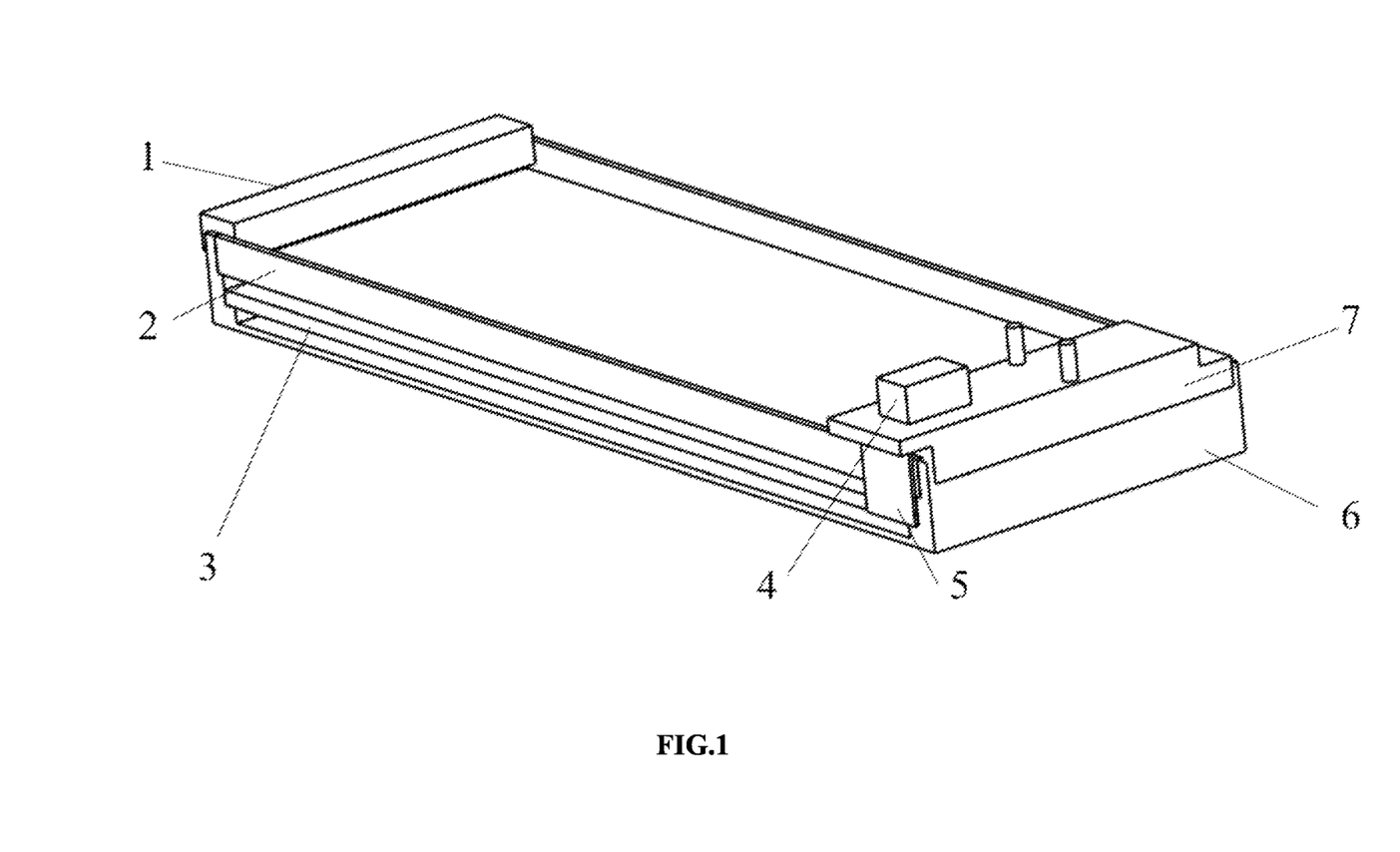
FIG. 1 is a structure schematic diagram of an open metal-air fuel cell unit in accordance with an embodiment of the present invention.

As shown in FIG. 1, the open metal-air fuel cell unit includes a fixing clamp 1, an air electrode 2, a metal electrode 3, a DCDC module 4 and a bus board 7.

The metal electrode 3 is a metal plate, which is completely and horizontally immersed in the electrolyte solution kept in the electrolyte solution tank. The metal electrode 3 is provided with the air electrode 2 thereon, and the electrolyte solution is arranged between the metal electrode 3 and the air electrode 2. The air electrode 2 has a trough-shaped structure, and the concave surface of the groove-shaped structure faces upwards and is in contact with air. The trough-shaped structure is also horizontally immersed in the electrolyte in the electrolyte tank, and the height of the electrolyte in the electrolyte tank needs to immerse the lower surface of the air electrode 2 and not be higher than the upper edge of the air electrode 2.

The air electrode 2 is equipped with the bus board 7 at one end, and equipped with the fixing clamp 1 at the other end. The metal electrode 3 and the air electrode 2 are both fixed together with the bus board 7 through copper sheets 5; anode and cathode wires built in the bus board 7 are electrically connected with the DCDC module 4. The DCDC module 4 mainly functions to lift pressure, which facilitates the metal-air fuel cell stack to match a loading input, and at the same time increases the voltage, reduces the output current, and reduces the loss. The open metal-air fuel cell unit is fixed within the electrolyte solution tank by using the fixing clamp 1.

Figure 2:
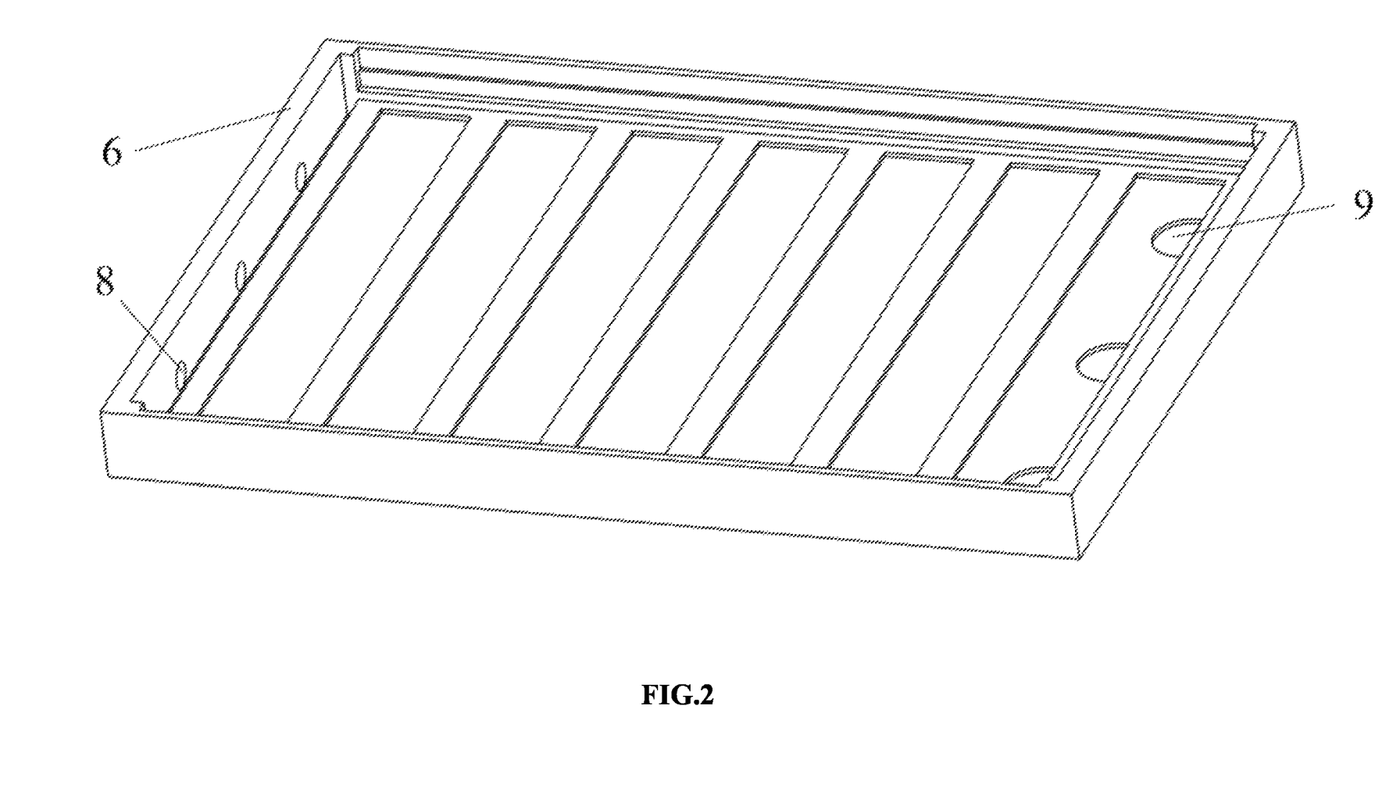
FIG. 2 is a structure schematic diagram of an electrolyte solution tank in accordance with an embodiment of the present invention.

In one embodiment of the present invention, the open metal-air fuel cell unit as shown in FIG. 1 is arranged in an electrolyte solution tank 6 as shown in FIG. 2. A hollow support plate is arranged in the middle of the electrolyte solution tank 6 to avoid direct contact between the metal electrode 3 and the electrolyte solution tank 6, and the electrolyte solution tank 6 are provided at either side with a solution inlet 8 and a solution outlet 9 with different sizes.

Figure 3:
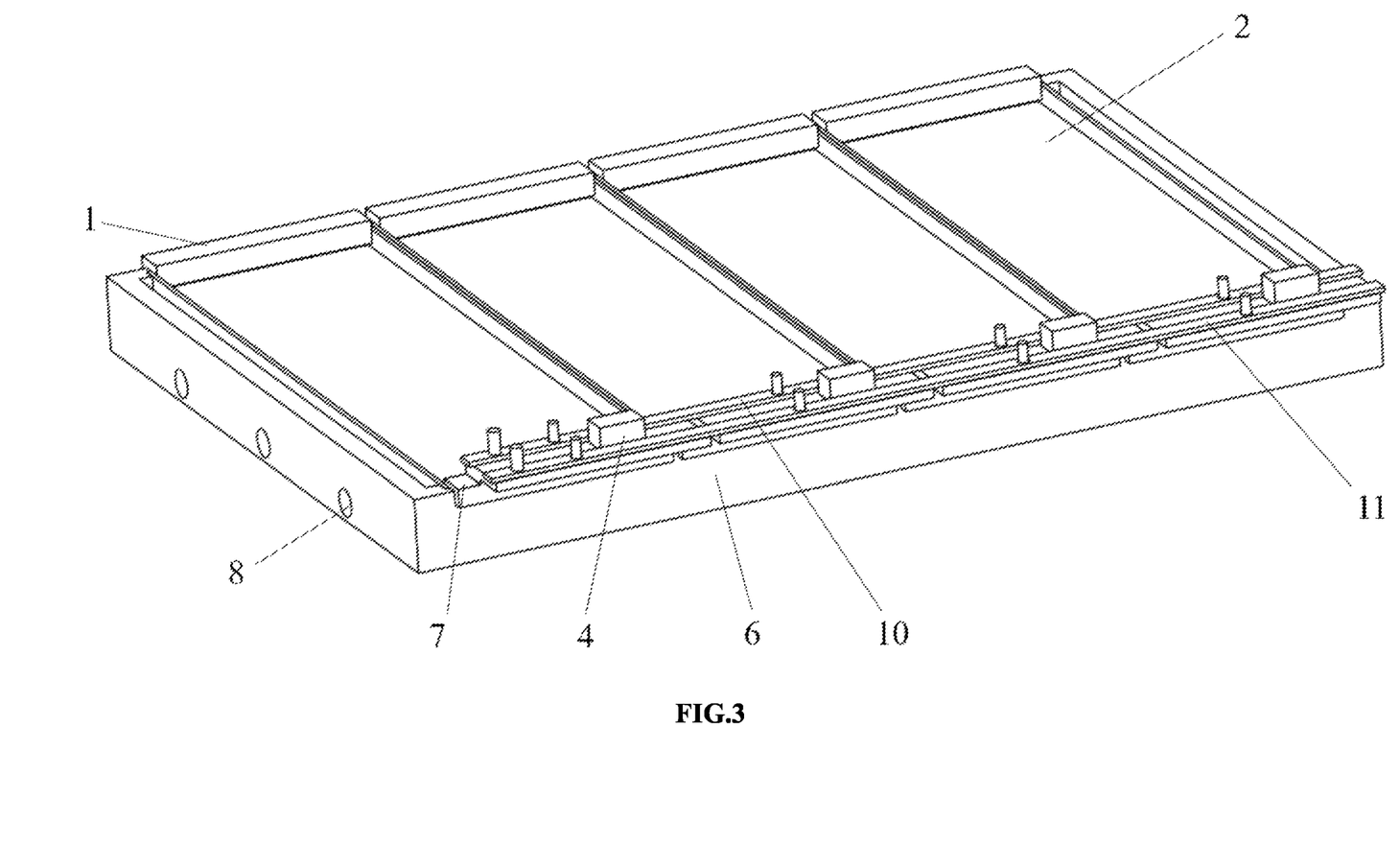
FIG. 3 is a structure schematic diagram of a metal-air fuel cell stack in accordance with an embodiment of the present invention.

According to the power requirement, several open metal-air fuel cell units are arranged in the electrolyte solution tank 6, and the open metal-air fuel cell units are connected in parallel to form a metal-air fuel cell stack as shown in FIG. 3. The metal-air fuel cell stack is provided with an anode bus 10 and a cathode bus 11, with two copper columns on each side of the anode bus 10 and the cathode bus 11, which are insulated from each other. The anode and cathode of each open metal-air fuel cell unit are respectively connected with the anode bus 10 and the cathode bus 11. The copper columns function to collect the current of the anode or cathode of each cell unit, which is equivalent to connecting the anode or cathode of each cell unit together.

Each bus board 7 may lead out two connection terminals as input terminals of the open metal-air fuel cell unit, and the input terminals can fix the anode and cathode electrodes of the open metal-air fuel cell unit with the anode bus 10 and the cathode bus 11 by nuts.

Figure 4:
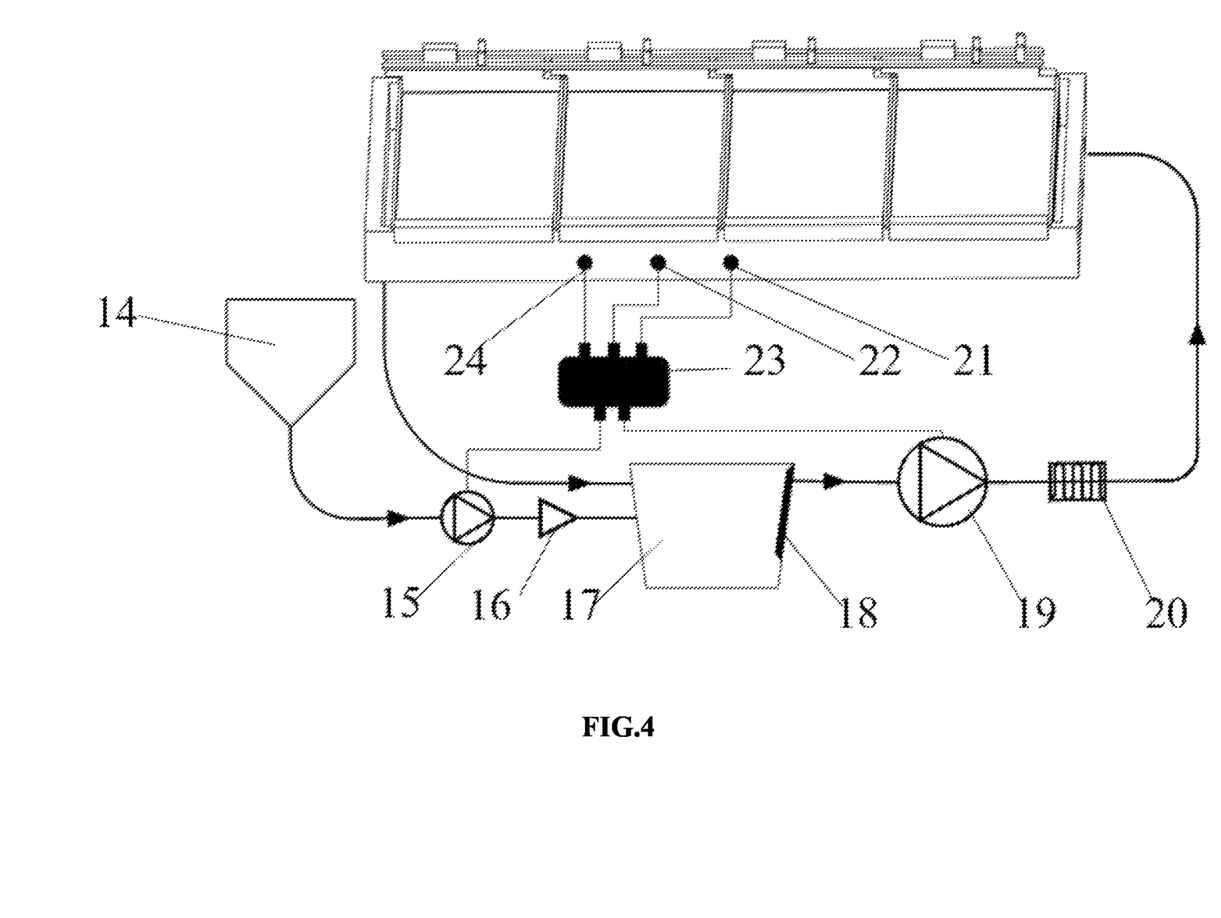
FIG. 4 is a structure schematic diagram of a metal-air fuel cell stack system in accordance with an embodiment of the present invention.

After adding the sensing subsystem, the circulating filtration subsystem and the electrolyte solution supplement subsystem, an intelligent metal-air fuel cell system is composed as shown in FIG. 4.

Optionally, the sensing subsystem includes a temperature sensor 21, a liquid level sensor 22 and a liquid concentration sensor 24.

Optionally, the circulating filtration subsystem includes a sedimentation tank 17, a filter screen 18, a circulating pump 19, and a heat sink 20.

The sedimentation tank has a first solution inlet, a second solution inlet, and a solution outlet; and the filter screen 18 is arranged in the sedimentation tank 17 and at the solution outlet of the sedimentation tank 17. A solution outlet 9 of the electrolyte solution tank is connected with a first solution inlet of the sedimentation tank 17 through a solution outlet pipeline; and a solution outlet of the sedimentation tank 17 is connected with a solution inlet 8 of the electrolyte solution tank through the first solution inlet pipeline, and the circulating pump 19 and the heat sink 20 arranged on the first solution inlet pipeline.

The electrolyte solution supplement subsystem includes a solution supplement tank 14, a solution supplement pump 15, and a check valve 16; a solution outlet of the solution supplement tank 14 is connected with a second solution inlet of the sedimentation tank 17 of the circulating filtration subsystem through the second solution inlet pipeline, and the solution supplement pump 15 and the check valve arranged on the second solution inlet pipeline.

The controller 23 is electrically connected with the solution supplement pump 15 and the circulating pump 19, respectively.

The cycle process of the metal-air fuel cell system is that the temperature sensor 21, the liquid level sensor 22 and the liquid concentration sensor 24 in the electrolyte solution tank 6 input sensing signals into the controller 23 (in this embodiment, the controller 23 is preferably an ECU control chip). The controller 23 controls the circulating pump 19 and the heat sink 20 to operate according to the temperature information collected by the temperature sensor 21. During the operation of the circulating pump 19 and the heat sink 20, the electrolyte solution in the electrolyte solution tank 6 enters the sedimentation tank 17 from the solution outlet and the outlet pipeline. The electrolyte solution in the sedimentation tank 17 is blocked by the filter screen 18, which deposits the electrolyte precipitation at the bottom of the sedimentation tank 17 which can be removed and recycled. Then the clear electrolyte solution passes through the circulating pump 19, flows through the heat sink 20, and returns to the electrolyte solution tank 6. The circulating flow is determined by the controller 23 according to the temperature sensor 21.

The controller 23 controls the operation of the solution supplement pump 15 according to the liquid level information and concentration information collected by the liquid level sensor 22 and the liquid concentration sensor 24. During the operation of the solution supplement pump 15, a concentrated electrolyte solution or pure water (concentrated electrolyte solutions for acidic and alkaline electrolyte solutions, and pure water for neutral electrolyte solutions, depending on different types of cell electrolyte solutions) in the solution supplement tank 14 can be injected into the sedimentation tank 17 through the check valve 16. The injected solution supplement flow is calculated by the controller 23 according to the data of the liquid level sensor 22 and the liquid concentration sensor 24.

The power supply of the circulating pump 19, the solution supplement pump 15, the ECU control chip 23, the temperature sensor 21, the liquid level sensor 22 and the liquid concentration sensor 24 are all covered by the metal-air fuel cell stack which may obtains voltages required by different electrical apparatuses through a power supply module.

The main calculation process is shown as below:

Calculation of a Number of Open Metal-Air Fuel Cell Units

Assuming an output power of the metal-air fuel cell stack is P and a rated power of an open metal-air fuel cell unit is $P_0$, the number of open metal air fuel cell units is n.

$$n = \text{round}\left(\frac{P}{P_0}\right) + 2,$$

wherein round is an integer function.

Heat Sink Design

Assuming that a heating coefficient of the metal-air fuel cell stack is c, a heating power is: $P_k = cP$.

Assuming a rated flow rate of the heat sink is Q, and a temperature difference between the inlet and outlet is $\Delta T$, a rated cooling power is: $P_e = kQ\Delta T$, wherein k is a specific heat capacity of electrolyte solution.

It is required that $P_e > P_h$, with the Q being given and k being known, it is calculated that $$\Delta T \geq \frac{P_k}{kQ}.$$

With $\Delta T$ and Q being known, the design may be performed for the heat sink.

Calculation of Circulating Pump

Flow: $Q_p \geq Q$.

Lift: the resistance coefficient of the whole system is $\lambda$ for which $p \geq \lambda Q$ is required.

Calculation of Solution Supplement Pump

Since the solution supplement pump has a relatively small flow and lift, it simply needs to select a small sinking pump.

According to an embodiment of the present invention, the open metal-air fuel cell system capable of uninterruptible power supply innovatively adopts a large unit, and the cell unit also has an open structure, wherein each cell unit adopts a parallel connection mode, thereby reducing the transmission current, lifting the transmission voltage and improving the efficiency. Each cell unit has an independent DCDC module, and the output voltage and power of the metal-air fuel cell stack are both related to the external power supply requirements. All cell units are arranged within a large electrolyte solution tank, wherein the air electrode has its air side exposed to absorb oxygen in the air, and its ionic side immersed in the electrolyte solution, while the metal electrode is immersed in the electrolyte solution. The electrolyte solution tank is equipped with various sensors therein, including a temperature sensor, a liquid level sensor and a liquid concentration sensor, which are connected with a circulating pump and a solution supplement pump through pipelines and implement liquid circulation and electrolyte solution supplement according to data from the liquid concentration sensor. Different metal-air fuel cells adopt different compositions of the supplement solution. For the acidic electrolyte solution, high-concentration acid solutions are mainly used for supplement; for the alkaline electrolyte solution, high-concentration alkaline solutions are mainly used for supplement; and for the neutral electrolyte solution, purified water is used for supplement. The liquid level sensor is responsible for accurately controlling the liquid level height to ensure that the air electrode has its ionic side immersed while its air side exposed, wherein the air side is designed as a groove structure (or a concave structure), which adapts to light liquid level fluctuation.

In general, embodiments of the present invention solve the problem of electrolyte solution maintenance and cooling of metal-air fuel cell stacks in the prior art, thus eliminating the need of the sealing structure, enabling the metal electrode replacement of the cell under uninterruptible power supply, greatly simplifying the maintenance of air cells, and widening the application.

In this specification, various embodiments are described in a progressive manner, with each embodiment focusing on its differences from other embodiments, while cross reference would be enough for those same or similar parts between the embodiments. As the system disclosed in the embodiment corresponds to the method disclosed in the embodiment, the description is relatively simple, and the correlated parts can be found in the method description.

Principles and implementation of this present invention are described by specific examples, and the explanation of the above embodiments is only used to help understand the method and its core idea of the present disclosure. Also, those of ordinary skills in the art may take some modifications in the specific implementation and application scope according to the idea of the present disclosure. To sum up, the content of this specification should not be construed as limiting the present disclosure.

What is claimed is:

1. An open metal-air fuel cell system capable of uninterruptible power supply, comprising a metal-air fuel cell, a sensing subsystem, a controller, and a circulating filtration subsystem; wherein
the metal-air fuel cell stack comprises an electrolyte solution tank and several open metal-air fuel cell units; the open metal-air fuel cell units are sequentially arranged within the electrolyte solution tank, and all the open metal-air fuel cell units are connected with each other in parallel;
wherein an open metal-air fuel cell unit comprises a metal electrode and an air electrode; the metal electrode is positioned below the air electrode; the air electrode has a trough structure, and the trough structure has a concave surface upwards; an electrolyte solution in the electrolyte solution tank is at a height submerging lower surfaces of the metal electrode and the air electrode without surpassing an upper edge of the air electrode;
the sensing subsystem is arranged in the electrolyte solution tank; the sensing subsystem is used for acquiring temperature information, liquid level information and concentration information of the electrolyte solution and sending the temperature information, the liquid level information and the concentration information of the electrolyte solution to the controller;
a solution outlet of the electrolyte solution tank is connected with a first solution inlet of the circulating filtration subsystem through a solution outlet pipeline; a solution inlet of the electrolyte solution tank is connected with a solution outlet of the circulating filtration subsystem through a first solution inlet pipeline; and
the controller is electrically connected with the circulating filtration subsystem; and the controller is used for controlling a circulating flow of the circulating filtration subsystem according to temperature information of the electrolyte solution.

2. The open metal-air fuel cell system capable of uninterruptible power supply according to claim 1, also comprising an electrolyte solution supplement subsystem; wherein an solution outlet of the electrolyte solution supplement subsystem is connected with a second solution inlet of the circulating filtration subsystem through a second solution inlet pipeline; wherein
the controller is electrically connected with the electrolyte solution supplement subsystem; and the controller is used for controlling a supplement flow of the electrolyte solution supplement subsystem according to liquid level information and concentration information of the electrolyte solution.

3. The open metal-air fuel cell system capable of uninterruptible power supply according to claim 1, wherein the open metal-air fuel cell unit further comprises a fixing clamp, a DCDC module and a bus board; wherein
the air electrode is equipped with the bus board at one end, and equipped with the fixing clamp at the other end; the metal electrode and the air electrode are both fixed together with the bus board through copper sheets; wherein
anode and cathode wires built in the bus board are electrically connected with the DCDC module; and
the open metal-air fuel cell unit is fixed within the electrolyte solution tank by using the fixing clamp.

4. The open metal-air fuel cell system capable of uninterruptible power supply according to claim 1, wherein a hollow support plate is arranged in the middle of the electrolyte solution tank, and the electrolyte solution tank are provided at either side with a solution inlet and a solution outlet with different sizes; and the hollow support plate is used for avoiding direct contact between the metal electrode and the electrolyte solution tank.

5. The open metal-air fuel cell system capable of uninterruptible power supply according to claim 1, wherein the metal-air fuel cell stack is provided with an anode bus and a cathode bus; the anode of each open metal-air fuel cell unit is connected with the anode bus, and the cathode of each open metal-air fuel cell unit is connected with the cathode bus.

6. The open metal-air fuel cell system capable of uninterruptible power supply according to claim 3, wherein the bus board is provided with two connecting terminals, namely a first connection terminal and a second connecting terminal; the first connecting terminal uses nuts to fix the anode of the open metal-air fuel cell unit and the anode bus of the metal-air fuel cell stack; and the second connecting terminal uses nuts to fix the cathode of the open metal-air fuel cell unit and the cathode bus of the metal-air fuel cell stack.

7. The open metal-air fuel cell system capable of uninterruptible power supply according to claim 1, wherein the circulating filtration subsystem includes a sedimentation tank, a filter screen, a circulating pump, and a heat sink; wherein the sedimentation tank has a first solution inlet and a solution outlet, wherein the filter screen is arranged in the sedimentation tank and at the solution outlet; and a solution outlet of the electrolyte solution tank is connected with a first solution inlet of the sedimentation tank through a solution outlet pipeline; and a solution outlet of the sedimentation tank is connected with a solution inlet of the electrolyte solution tank through the first solution inlet pipeline, and the circulating pump and the heat sink arranged on the first solution inlet pipeline.

8. The open metal-air fuel cell system capable of uninterruptible power supply according to claim 2, wherein the electrolyte solution supplement subsystem includes a solution supplement tank, a solution supplement pump, and a check valve; wherein a solution outlet of the solution supplement tank is connected with a second solution inlet of the sedimentation tank of the circulating filtration subsystem through the second solution inlet pipeline, and the solution supplement pump and the check valve arranged on the second solution inlet pipeline.

9. The open metal-air fuel cell system capable of uninterruptible power supply according to claim 2, wherein the controller is electrically connected with a solution supplement pump in the electrolyte solution supplement subsystem and a circulating pump of the circulating filtering subsystem respectively.

10. The open metal-air fuel cell system capable of uninterruptible power supply according to claim 1, wherein the sensing subsystem includes a temperature sensor, a liquid level sensor and a liquid concentration sensor.

* * * * *